Patented Sept. 4, 1934

1,972,102

UNITED STATES PATENT OFFICE 1,972,102

HYDROCARBON OIL TREATMENT

William M. Malisoff, Philadelphia, Pa., assignor to The Atlantic Refining Company, Philadelphia, Pa., a corporation of Pennsylvania No Drawing. Application December 12, 1930, Serial No. 502,009

6 Claims. (Cl. 196—29)

The present invention relates to the art of refining hydrocarbon oils, and has particular relation to the removal of sulfur from hydrocarbon oils, such as petroleum and fractions thereof which contain surfur to an objectionable extent.

While my process is applicable to the removal of sulfur compounds from hydrocarbon oils in general, it is particularly adapted to the removal of sulfur from relatively low boiling sulfur-containing petroleum distillates, such as naphtha, gasoline, lamp oil and gas oil. I have found that sulfur-containing hydrocarbon oils may be materially reduced in sulfur content by treating the oil with a certain type of oxidizing agent, of which type hydrogen peroxide is an example, effecting such treatment in the presence of an organic acid.

In accordance with my invention a suitable treating solution may be prepared by adding to a concentrated water solution of hydrogen peroxide, a quantity of organic acid, preferably sufficient to impart at least partial oil solubility to the treating solution. Acetic acid is the preferred organic acid for use in this connection, however, other organic acids such as propionic and/or butyric are also operable. I bring the treating solution into intimate contact with the hydrocarbon oil containing undesirable amounts of sulfur, whereby at least some of the sulfur is changed into a water soluble form, is separated from the oil by preferentially dissolving in the treating solution, and is removed from the oil when the treating solution is drained or otherwise separated therefrom.

In addition to a concentrated water solution of hydrogen peroxide, I may use other oxidizing agents having an oxidation potential similar to that of hydrogen peroxide. For example, I may use, inorganic peroxides such as lead peroxide, or per salts such as perborates, persulfates and permanganates, which form hydrogen peroxide in a slightly acid environment, such as in the presence of acetic acid. I may also use as my oxidizing agent addition compounds of hydrogen peroxide wtih inorganic salts, for instance $Na_2SO_4.10(H_2O_2)$, or addition compounds of hydrogen peroxide with organic substances, for example $CO(NH_2)_2H_2O_2$. I prefer to use a treating solution consisting of acetic acid and a concentrated water solution of hydrogen peroxide.

The sulfur-containing oil is mixed with my treating solution and the mixture is agitated to insure proper contact and reaction between the oxidizing agent and the sulfur content of the oil. Upon cessation of agitation the treating solution and the oil separate into layers. As the organic acid is employed in quantities sufficient to render the treating solution at least partially soluble in the oil, it is necessary to add a quantity of water to the solution of oil and treating solution before substantial separation into layers will take place. The treating solution layer, which contains the oxidized sulfur compounds, may then be removed from the oil layer, or vice versa, as for example by decantation. Repeatedly contacting the sulfur-containing oil with fresh portions of treating solution results in greater sulfur reduction. Also my process may be carried out in a semi-continuous or continuous manner according to known conventional procedure.

In effecting oxidation of sulfur contained in hydrocarbon oils, there may be obtained a variety of oxidation products, depending upon the oxidation potential of the oxidizing agent and the conditions of operation. Some of the products of oxidation are preferentially water soluble, whereas others are preferentially soluble in the oil. Operation according to my process as described hereinbefore results in oxidation such as will form preferentially water soluble products. These water soluble sulfur materials are formed to some extent by treatment of the oil with a water solution of my oxidizing agent, but the oxidation reaction is much more effective and better controlled in the presence of an organic acid of the class specified, whereby a maximum amount of oxidation products of optimum solubility in the treating solution is obtained. Experimentation under alkaline conditions indicates that such conditions are not conducive to the desired oxidation reaction.

While oxidation and extraction of sulfur as described above is effectively and ordinarily carried out at normal atmospheric temperatures, slightly elevated temperatures increase the rate of reaction, and as a consequence reduce the time necessary for completion of the reaction. In any case the temperature should be below the boiling point of the oil and/or organic acid employed. Ordinarily, temperatures below 100° F. are preferred.

A "sour" oil may be rendered sweet by my process, indicating oxidation and removal of mercaptans. That my process is not restricted to removal of the mercaptans, however, is shown by the following example of its operation.

Example 1

To 100 parts of a 30% solution of hydrogen peroxide in water was added 200 parts of glacial acetic acid. A "sweet" cracked petroleum distillate having a sulfur content of 0.21% was agitated with 20% by volume of this reagent for about 10 minutes at a temperature of approximately 90° F. After dilution of the treating solution with an equivalent volume of water and separation of the diluted solution from the distillate, the latter was found to contain 0.16% sulfur.

Additional examples of my process are as follows:

Example 2

A gas oil containing 1.12% sulfur was washed with a treating solution which contained a concentrated water solution of potassium permanganate to which had been added a double quantity of glacial acetic acid. The sulfur content of the gas oil was reduced to 0.88% after 30 minutes agitation with the treating solution.

Example 3

A treating solution was prepared by adding one part of a 30% water solution of hydrogen peroxide to two parts of glacial acetic acid. A naphtha obtained by cracking and having a sulfur content of .25% was agitated with this treating solution for 30 minutes, the temperature of this mixture being maintained at substantially 95° F. during the treatment. After separation of the treating solution from the oil, the latter was found to contain 0.1% sulfur, which comprised a reduction of substantially 60% in sulfur content.

What I claim is:—

1. A process for removing sulfur compounds from hydrocarbon oils, which comprises washing the sulfur-containing oil with a treating solution containing acetic acid and a concentrated water solution of hydrogen peroxide, and separating said solution from the oil.

2. A process for removing sulfur compounds from hydrocarbon oils, which comprises washing the sulfur-containing oil with a treating solution containing a concentrated water solution of hydrogen peroxide and a sufficient quantity of acetic acid to render the treating solution miscible with the oil, and separating the treating solution from the oil.

3. A process for removing sulfur compounds from hydrocarbon oils, which comprises washing the sulfur-containing oil with a treating solution containing a concentrated water solution of hydrogen peroxide and a sufficient quantity of acetic acid to render the treating solution miscible with the oil, and separating the treating solution from the oil by adding water to said treating solution.

4. A process for removing sulfur compounds from hydrocarbon oils, which comprises washing the sulfur-containing oil with a treating solution containing a concentrated water solution of hydrogen peroxide and a sufficient quantity of acetic acid to render said treating solution soluble in the oil, adding sufficient water to the mixture of oil and treating solution to cause the treating solution to separate from the oil, and removing the separated treating solution.

5. A process for removing sulfur compounds hydrocarbon oils, which comprises washing the sulfur-containing oil with a treating solution containing acetic acid and a concentrated water solution of at least one substance from the group consisting of inorganic peroxides, per salts which form hydrogen peroxide in the presence of an organic acid, and addition compounds of hydrogen peroxide, whereby the sulfur compounds contained in the oil are oxidized to form water soluble sulfur compounds.

6. A process for removing sulfur compounds from hydrocarbon oils, which comprises subjecting the oil to repeated washes with fresh portions of a treating solution containing acetic acid and a concentrated water solution of hydrogen peroxide, and separating said treating solution from the oil after each wash.

WILLIAM M. MALISOFF.

CERTIFICATE OF CORRECTION.

Patent No. 1,972,102.                                September 4, 1934.

WILLIAM M. MALISOFF.

It is hereby certified that error appears in the printed specification of the above numbered patent requiring correction as follows: Page 1, line 43, for "wtih" read with; page 2, line 98, claim 5, after "compounds" insert from; and that the said Letters Patent should be read with these corrections therein that the same may conform to the record of the case in the Patent Office.

Signed and sealed this 16th day of October, A. D. 1934.

Leslie Frazer (Seal)                                               Acting Commissioner of Patents.